(12) United States Patent
Linburn (10) Patent No.: US 8,448,061 B1
(45) Date of Patent: May 21, 2013

(54) USER INTERFACES AND METHODS TO CREATE ELECTRONIC DOCUMENTS WITH FORMS IMPLEMENTING CONTENT INPUT FIELDS

(75) Inventor: Carol Linburn, San Francisco, CA (US)

(73) Assignee: Adobe Systems Incorporated, San Jose, CA (US)

(*) Notice: Subject to any disclaimer, the term of this patent is extended or adjusted under 35 U.S.C. 154(b) by 962 days.

(21) Appl. No.: 11/731,687

(22) Filed: Mar. 30, 2007

(51) Int. Cl.
*G06N 3/00* (2006.01)

(52) U.S. Cl.
USPC .......................................................... 715/224

(58) Field of Classification Search
USPC ................. 715/221, 222, 223, 224, 225, 226, 715/268
See application file for complete search history.

(56) References Cited

U.S. PATENT DOCUMENTS

| | | | |
|---|---|---|---|
| 5,704,029 A * | 12/1997 | Wright, Jr. ..................... | 715/223 |
| 6,012,102 A | 1/2000 | Shachar | |
| 6,302,329 B1 | 10/2001 | Iwai et al. | |
| 6,597,392 B1 * | 7/2003 | Jenkins et al. ............. | 348/207.1 |
| 6,727,909 B1 | 4/2004 | Matsumura et al. | |
| 6,786,412 B2 | 9/2004 | Shimizu | |
| 7,086,002 B2 | 8/2006 | Elo et al. | |
| 7,136,528 B2 | 11/2006 | Edwards et al. | |
| 7,154,534 B2 * | 12/2006 | Seki et al. .................. | 348/207.1 |
| 7,180,618 B2 | 2/2007 | Ueda et al. | |
| 7,313,759 B2 * | 12/2007 | Sinisi ............................ | 715/234 |
| 7,644,350 B2 * | 1/2010 | Piersol .......................... | 715/221 |
| 2003/0194148 A1 * | 10/2003 | Haeberli ....................... | 382/283 |
| 2004/0083134 A1 * | 4/2004 | Spero et al. ..................... | 705/16 |
| 2004/0181749 A1 * | 9/2004 | Chellapilla et al. ........... | 715/505 |
| 2005/0149364 A1 * | 7/2005 | Ombrellaro ....................... | 705/3 |
| 2005/0208962 A1 * | 9/2005 | Kim .......................... | 455/550.1 |
| 2005/0219263 A1 * | 10/2005 | Thompson et al. ........... | 345/619 |
| 2005/0228683 A1 * | 10/2005 | Saylor et al. ...................... | 705/1 |
| 2005/0262429 A1 * | 11/2005 | Elder et al. .................... | 715/507 |
| 2006/0001932 A1 | 1/2006 | Sekiguchi | |
| 2006/0033754 A1 | 2/2006 | Evans | |
| 2006/0149833 A1 * | 7/2006 | Dan et al. ...................... | 709/218 |
| 2006/0150091 A1 | 7/2006 | Suzuki et al. | |
| 2006/0170669 A1 | 8/2006 | Walker et al. | |
| 2006/0204129 A1 | 9/2006 | Sawano | |
| 2007/0035616 A1 * | 2/2007 | Lee et al. ................... | 348/14.16 |

OTHER PUBLICATIONS

"Using Rich Ink Technology in Microsoft Windows CE 3.0," Microsoft Corporation, Jun. 2000, 7 pages.
"Kodak DC215 Zoom Digital Camera Adding a Template to Your Picture," Kodak Corporation, Aug. 1999, 2 pages.

* cited by examiner

*Primary Examiner* — Kyle Stork
(74) *Attorney, Agent, or Firm* — Wolfe-SBMC (57) ABSTRACT

Embodiments of the invention relate generally to computing devices and systems, software, computer programs, applications, and user interfaces, and more particularly, to implementing content input fields in forms to create electronic documents, among other things.

22 Claims, 10 Drawing Sheets

USER INTERFACES AND METHODS TO CREATE ELECTRONIC DOCUMENTS WITH FORMS IMPLEMENTING CONTENT INPUT FIELDS

FIELD OF THE INVENTION

Embodiments of the invention relate generally to computing devices and systems, software, computer programs, applications, and user interfaces, and more particularly, to implementing content input fields in forms to create, for example, electronic documents.

BACKGROUND OF THE INVENTION

Improved communications networks and electronic display technologies have contributed to the adoption of electronic documents as a principle vehicle for exchanging and memorializing information. To create a conventional electronic document, users typically enter alpha-numeric characters—as text—into text input fields of an electronic form, such as an HTML-based or XML-based form. To create traditional electronic documents with pictures, however, users are usually required to import an image from a picture file. Browser-based applications, for example, can be used to create web-based electronic documents by prompting a user to search for a picture file in some sort of file management system (e.g., a hierarchy of folders). Once the user finds the picture file, the associated picture will be imported into the web-based electronic document. While functional, there are certain drawbacks to these techniques for creating electronic documents.

One drawback to importing images into electronic documents is that a user is typically required to perform multiple steps, and, thus, is burdened to know—a priori—the file name, and to expend efforts to search for the picture file. Another drawback is that users typically edit pictures using a separate application in a different window, thereby necessitating a transition from the presentation of the electronic form (e.g., in one window) to a picture editor (e.g., in another window). Often times, later-opened windows that include a picture editor obscure previously-opened windows that include the electronic document. While some current applications use pictures to create printed documents, such as name tags, these applications usually implement static templates that include unmodifiable graphics and text, and can require multiple windows to construct a printed document. A static template can typically be described as an electronic file having a preset, customized format and structure that is used as a starting point for a particular application so that the unmodifiable graphics and text of the template need not be recreated each time it is used. Further, multiple windows can obscure each other, especially when presented on relatively small interfaces, such as those on mobile phones and personal digital assistants ("PDAs").

It would be desirable to provide improved techniques, systems and devices that minimize one or more of the drawbacks associated with conventional techniques for creating electronic documents.

BRIEF DESCRIPTION OF THE FIGURES

The invention and its various embodiments are more fully appreciated in connection with the following detailed description taken in conjunction with the accompanying drawings, in which.

Like reference numerals refer to corresponding parts throughout the several views of the drawings. Note that most of the reference numerals include one or two left-most digits that generally identify the figure that first introduces that reference number.

DETAILED DESCRIPTION

Figure 1A:
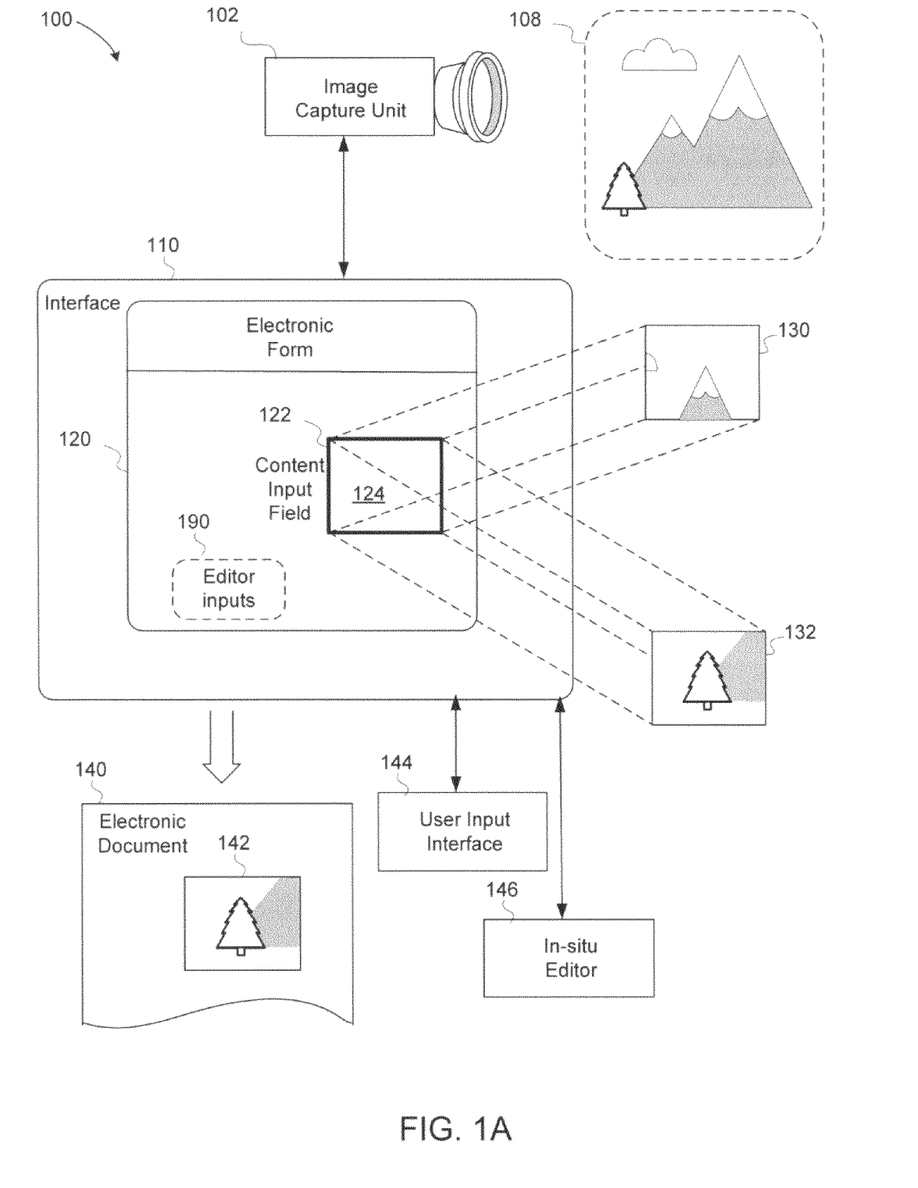
FIG. 1A is a diagram of an interface implementing one or more content input fields to create electronic documents, according to at least one embodiment of the invention.

FIG. 1A is a diagram 100 of an interface implementing one or more content input fields to create, for example, electronic documents, according to at least one embodiment of the invention. In the context of creating an electronic document 140, interface 110 is configured to implement a content input field 124 as at least part of an electronic form 120. Content input field 124 is configured to accept content for presentation coincident (or substantially coincident) with the presentation of electronic form 120 in interface 110. In one embodiment, content input field 124 operates to sample content responsive to a user input, such as an input to select content input field 124. As such, a user can preview the content in the context of electronic form 120 prior to creating electronic document 140. Content input field 124, therefore, enables a user to sample content and to optionally modify the content before finalizing electronic document 140 by, for example, integrating the modified content into electronic form 120.

In view of the foregoing, content input field 124 enables a user to readily integrate content into electronic documents, thereby enhancing the functionality of electronic document 140. Namely, content input field 124 facilitates the addition of content, such as audio, graphics, animation, video, still images, and/or interactivity, to supplement text input fields text (not shown) as well as other alpha-numeric character input fields. Further, content input field 124 enables a user to preview content and modify the content in the context of electronic form 120, without requiring, for example, a transition away (or interrupting the display thereof) to another panel. In addition, content input field 124 can be configured to directly present content, such as images, thereby obviating the necessity to import content from a content file, such as a file containing image data. In at least one embodiment, a user can edit the content in relation to (e.g., directly in or in association with) content input field 124, thereby eliminating a requirement to access an editing application for purposes of editing the content.

To illustrate, consider the example in FIG. 1A in which content input field 124 is configured to accept image data that represents one or more images. Note that the term, "image" can refer, in at least one embodiment, to a still image or a collection of images that constitute video. Content input field 124, in this example, is an image data input field for electronic form 120 and is configured to accept imagery as content. As such, content input field 124—in whole or in part—an be configured to present an image in real-time (or substantially in real-time) for an interface 110. Next, consider that electronic form 120 is configured to accept user input via user input interface 144. In one embodiment, selection of content input field 124 activates an image capture unit 102, thereby facilitating entry of image data into content input field 124. In this example, the image data represents a scene including a mountain range as a subject 108. Once selected, content input field 124 can sample images in a continual fashion until, for example, user input interface 144 initiates the capture of at least a portion 130 of subject 108. As shown, portion 130 represents a captured image within a boundary 122. Thus, content input field 124 and electronic form 120 provide for a preview of electronic document 140 prior to finalization. In one embodiment, content input field 124 and electronic form 120 can be rendered in a single panel.

Further to the example shown, consider that a user wishes to modify the content data in association with content input field 124 by, for example, recapturing another portion 132 of subject 108. The modified image can be displayed simultaneous (or substantially simultaneous) with electronic form 120. To modify the content data (i.e., image data), user input interface 144 can be configured to dispense with image data for portion 130, and to resample portions of subject 108 in real-time. In one embodiment, the modified image for a recaptured portion 132 is formed by translating either one or more images relative to boundary 122, or vise versa. For instance, a user can move image capture unit 102 relative to a fixed position in space to translate the images relative to boundary 122. In one embodiment, the user can translate portions of subject 108 to include a characteristic of a subject. For example, a user can translate from the image associated with portion 130 to the image associated with portion 132 to include a tree as a characteristic. In an alternative embodiment, boundary 122 can demarcate a time interval during which a portion of audio or a sound can be captured, if the content includes audio.

In one embodiment, interface 110 is configured to accept user inputs via user input interface 144 to edit the content, thereby forming edited content. In a specific embodiment, in-situ editor 146 can be configured to edit content data associated with content input field 124. Continuing with the previous example, in-situ editor 146 can be implemented to perform image-related edits, such as cropping an image, performing an automatic color balance or brightness balance, performing gamma corrections, performing red-eye removal, and the like. Further, in-situ editor 146 can be configured to edit a captured image, as well as recaptured images, within content input field 124 to generate an edited image in the context of electronic form 120. In various embodiments, in-situ editor 146 can be configured to edit captured images in portions 130 or 132 within content input field 124 without transitioning from electronic form 120 to implement an editor application, such as a stand-alone photo or video editing application. In one embodiment, electronic form 120 can present editor inputs 190 to select an image-related edit operation in the context of the form. In the example shown, editor inputs 190 can be presented as part of a panel that includes electronic form 120. Once a captured image (or recaptured image) has been modified and/or edited, it can be finalized to form electronic document 140. For example, portion 132 can be integrated into form 120 to create electronic document 140 with image 142.

As used herein, the term "content input field" refers generally, at least in one embodiment, to a data field that accepts content in real-time (or substantially in real-time) in association with an electronic form, whereby the content associated with the content input field can be integrated with an electronic form to create an electronic document. As used herein, the term "content," at least in one embodiment, refers to information and/or material (e.g., multi-media information) presented within an interface in relation to, for example, a web site or a data entry application, such as a software product, for creating electronic documents. Content can also include the audio and/or visual presentation of text, such as an electronic document (e.g., a document in Portable Document Format ("PDF")), as well as audio, images, audio/video media, such as Flash presentations, text, and the like. As used herein, the term "modified content" refers generally, at least in one embodiment, to content that has been either recaptured after a previous capture, or edited, or both. As used herein, the term "sampling" refers generally, at least in one embodiment, to receiving digitized representations of content in real-time, such as visual imagery generated by an image capture unit or device, for purposes of capturing content (e.g., as video or a still image). As used herein, the term "capture" refers generally, at least in one embodiment, to the storage and/or recordation of data representing images, sound, or the like. For example, a captured image can be still image (e.g., a "freeze frame") representing a portion of a subject. As another example, a captured video or audio can be a portion of video or audio for a finite duration of time.

As used herein, the term "subject," can refer to, at least in one embodiment, a person or thing photographed, as well as a sound, voice or music recorded. As used herein, the term "panel," at least in one embodiment, can refer to displays, palettes, tabs, windows, screens, portions of an interface, and the like. As used herein, the term "electronic form," can refer, at least in one embodiment, to an interactive form having data input fields, including a content input field. In one embodiment, each of the data input fields is implemented in single panel. In other embodiments, the data input fields for the electronic form can be distributed over multiple panels. As used herein, the term "electronic document," can refer, at least in one embodiment, to any data files (e.g., other than computer programs or system files) that are intended to be used in their electronic form, without necessarily being printed, whereby computer networks and electronic display technologies can help facilitate their use and distribution. Note that an electronic document can itself be defined as content, at least in one embodiment. As such, the electronic document can enable users to experience rich media content that is created with a content input field. As used herein, the term "integrating," as it relates to finalizing electronic documents can refer, at least in one embodiment, to generating an association between content and an electronic form, thereby combining the two for producing an electronic document. In some cases, the content is affixed as part of the electronic form, whereas in other cases, the content can be separable from the electronic document. When affixed, the content can be stored within a common data file as the electronic form, whereas separable content can be stored as a separate content file.

Figure 1B:
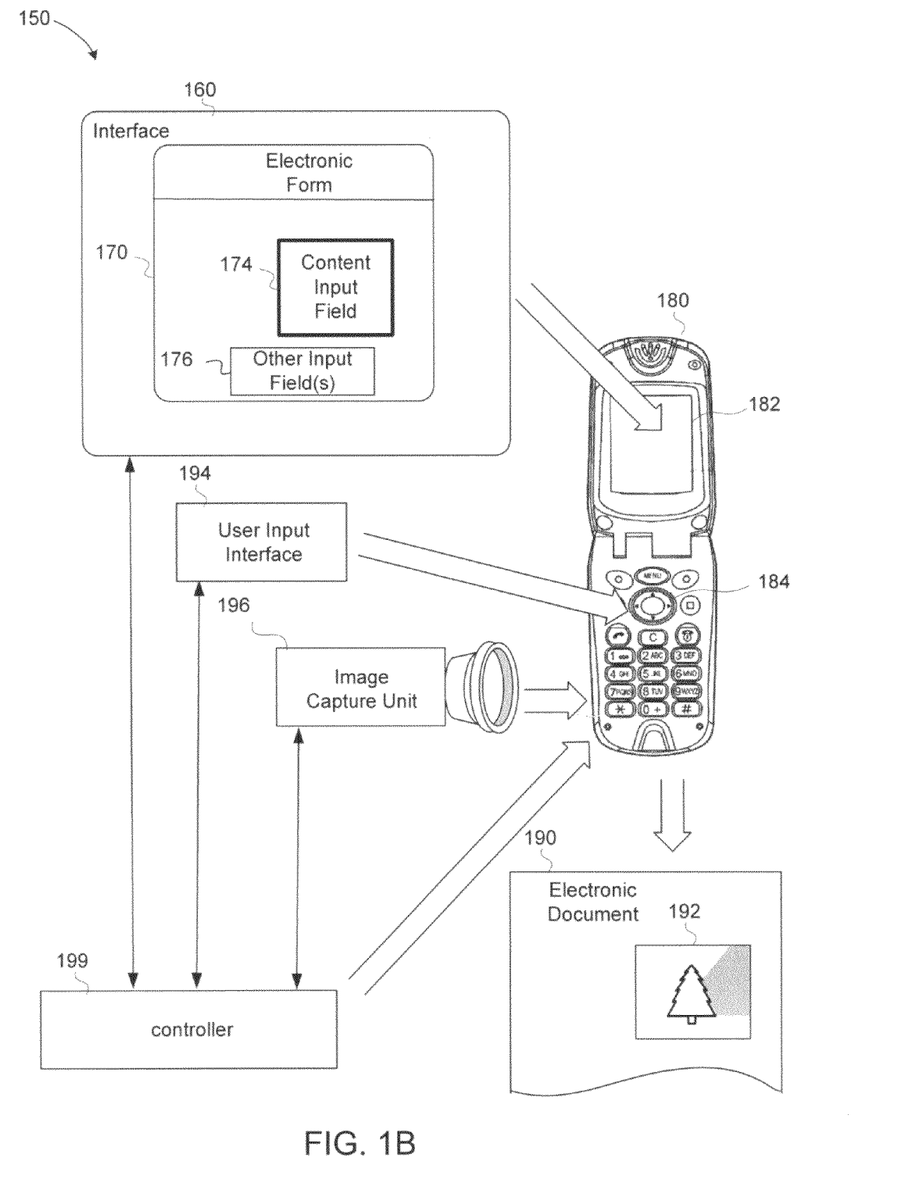
FIG. 1B is another diagram of an interface implementing a content input field to create electronic documents with a hand-held device, according to at least one other embodiment of the invention.

FIG. 1B is a diagram 150 of an interface implementing a content input field to create electronic documents with a hand-held device, according to at least one other embodiment of the invention. Hand-held device 180 is configured to include an interface 182 for displaying content (or representations thereof) within a content input field, such as content input field 174, and one or more user inputs 184. Interface 182 can be used to create an electronic document 190 that includes an image 192 captured in the association with the content input field. In the example shown, interface 160 can be implemented as interface 182. Interface 160 is configured to implement content input field 174 and one or more other input fields 176 for data entry, such as text input data and the like. Further, hand-held device 180 can include a controller 199 that is configured to coordinate the functionalities of interface 160, user input interface 194, and image capture unit 196.

In at least one embodiment, hand-held device 180 is a mobile phone having relatively limited resources, such as a minimal interface 182 and user input interface 194. Minimal interface 182 is typically smaller than displays used in laptop and desktop computing applications. Controller 199 can be configured to generate content input field 174 within a single panel, thereby obviating instances where multiple panels might obscure either the electronic form or the content, or both. User input interface 194 is usually limited to directional keys (e.g., up, down, left and/or right), such as user inputs 184, for navigating minimal interface 182. Controller 199 can also be configured to implement directional keys 184 to perform one or more operations with respect to the content in the context of interface 182. For example, a user can use directional keys 184 to navigate electronic form 170 to select content input field 174, which, in turn, causes content to be presented in association with content input field 174. For instance, selection of content input field 174 can initiate streaming of digitized imagery from image capture unit 196 to content input field 174. Directional keys 184 or other inputs in user input interface 194 can be implemented to capture, recapture, accept, reject, modify and/or edit the content. In various embodiments, controller 199 can be implemented in either hardware or software, or a combination thereof.

Figure 2:
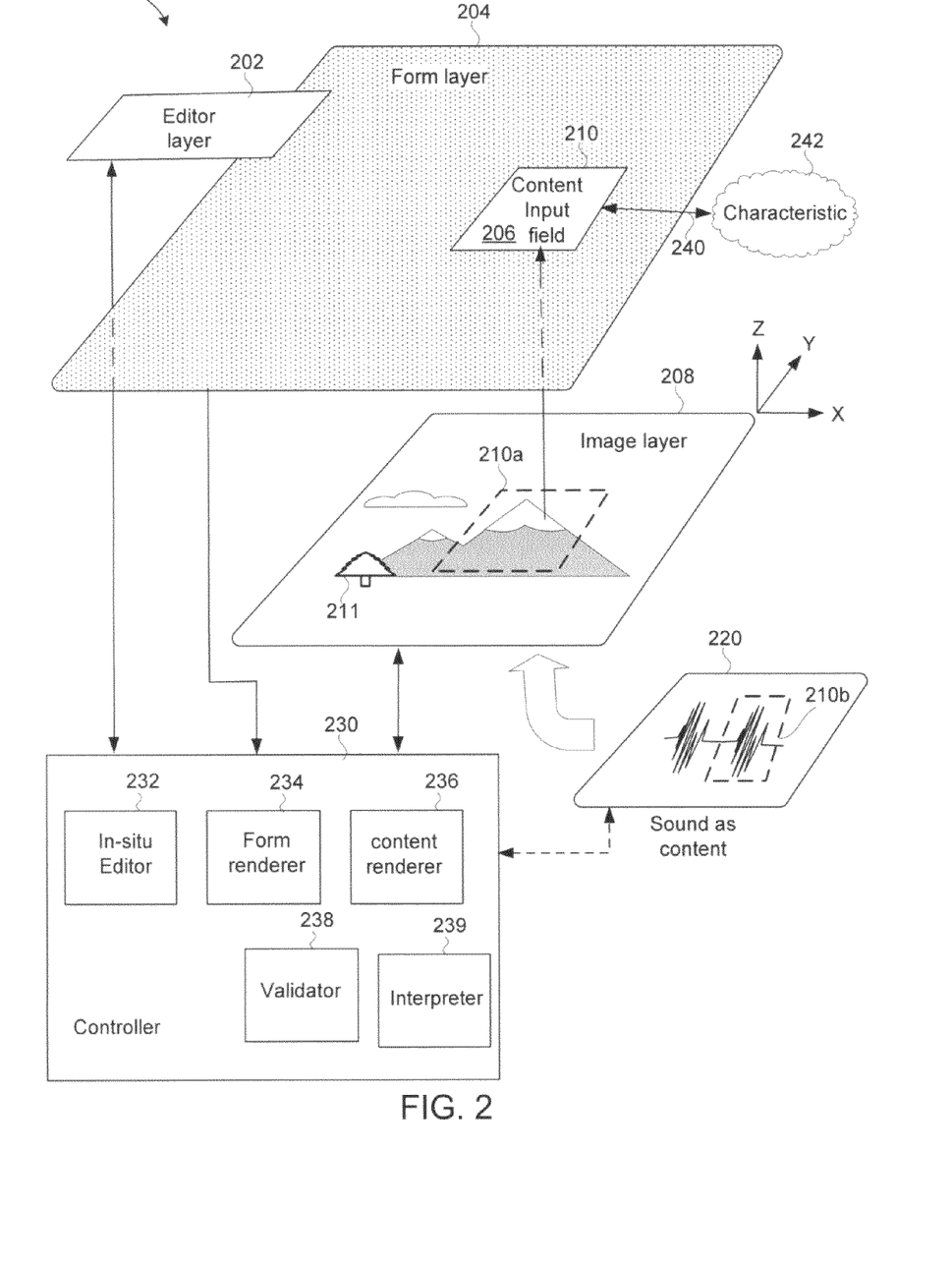
FIG. 2 is a diagram of a controller for generating in multiple layers to create an interface implementing a content input field, according to at least one embodiment of the invention.

FIG. 2 is a diagram 200 of a controller for generating in multiple layers to create an interface implementing a content input field, according to at least one embodiment of the invention. In this example, controller 230 is configured to generate an image layer 208 and a form layer 204, whereby both image layer 208 and form layer 204 can constitute, in whole or in part, an electronic form. In one embodiment, form layer 204 can include a transparent (or substantially transparent) content input field 206, where the transparency of content input field 206 facilitates the presentation of at least a portion of the image within a boundary 210. Further, controller 230 is configured to translate image layer 208 to translate the image relative to transparent content input field 206 and boundary 210. For example, translating image layer 208 in the X, Y, and/or Z spatial dimensions can provide for capturing a portion of the image at one point in time, and can further provide for recapturing another portion of the image at an another point in time. An example of one such portion is portion 210a, which is defined by boundary 210. Translating the image, as presented through transparent content input field 206, thereby can operate to modify the image to form a modified image. In another embodiment, controller 230 can operate to translate form layer 204 relative to image layer 208. In at least one embodiment, controller 230 can capture (e.g., store) image data constituting image layer 208, while enabling a user to subsequently translate image layer 208 to position portion 210a with respect to content input field 206.

In a specific embodiment, controller 230 can include a form renderer 234 configured to generate form layer 204, and a content renderer 236 configured to present content in association with content input field 206. In the example shown in FIG. 2, content renderer 236 can generate image layer 208 for presenting an image as content. In other embodiments, content renderer 236 can generate an audio layer 220 to associate a sound, voice and/or audio data to content input field 206. Controller 230 can be used to capture a portion 210b of a sound, voice and/or audio, responsive, for example, to a user input.

Optionally, controller 230 can include either an in-situ editor 232 or a validator 238, or both. Further, controller 230 can optionally include interpreter 239. In-situ editor 232 can be configured to edit the data representing captured content. In one embodiment, in-situ editor 232 can be configured to present an editor layer 202 as a content editor for editing the content. As such, editor layer 202 is configured to accept user input to edit the content in-situ to form edited content. For example, in-situ editor 232 facilitates the presentation of the edited content with respect to content input field 206 simultaneous to (or substantially simultaneously to) the presentation of form layer 204. In some cases, in-situ editor 232 can, for example, crop, remove red eye, modify the contrast and color, and/or other enhance an image. In other cases, in-situ editor 232 can, for example, cut, copy, delete, splice, and mix sounds together, as well as modify the speed or pitch of a captured audio, as well as amplify, normalize, or equalize the audio.

Validator 238 can be configured to analyze the content to determine whether any captured content associated with content input field 206 matches or (likely matches) a predetermined metric. In one embodiment, content input field 206 can relate via an association 240 to a characteristic 242 of the content sought to be captured. If there is a match, then validator 238 is configured to present an indication (not shown) that content input field 206 includes characteristic 242. For example, validator 238 can operate to determine whether portion 210a includes (or likely includes) a tree 211 as a characteristic of the subject. Thus, validator 238 can validate whether image data representing the image in portion 210a meet a first threshold indicative that the content in relation with content input field 206 includes characteristic 242. The first threshold, for example, can represent an amount of green-colored pixels that are associated with image data in content input field 206.

Interpreter 239 can be configured to interpret images and/or sounds (or portions there) to determine information. In a specific embodiment, interpreter 239 is configured to test whether image data representing the image presented in content input field 206 meet a second threshold to determine whether the image data complies with one or more requirements. For example, the second threshold can represent a confidence level that the shape of tree 211 matches at least one of a number of predetermined shapes for trees. If there is a match, there can be a relatively high likelihood that tree 211 can be characterized as being a tree. In a specific embodiment, interpreter 239 can perform optical character recognition processes to translate optically-scanned bitmaps of text characters into character codes, such as ASCII. Thus, interpreter 239 can convert portions of an image in content input field 206 to determine one or more alpha-numeric characters. In another embodiment, interpreter 239 can perform speech recognition to translate audio into alpha-numeric characters. In various embodiments, interpreter 239 can interpret or convert content presented in association with content input field 206 into another form for implementation as an electronic document.

Figure 3:
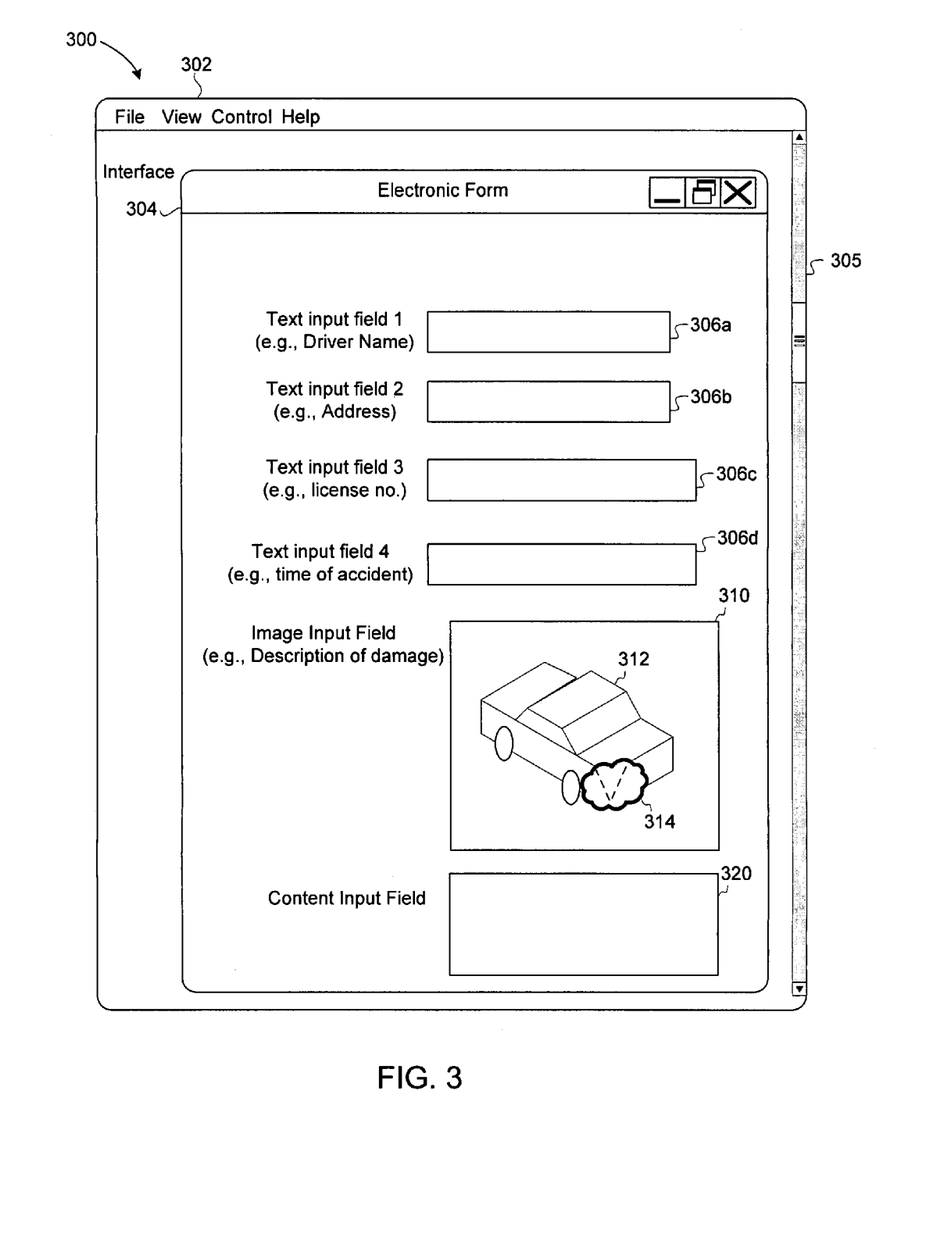
FIGS. 3 and 4 are examples of interfaces implementing one or more content input fields, according to various embodiments of the invention.
Figure 4:
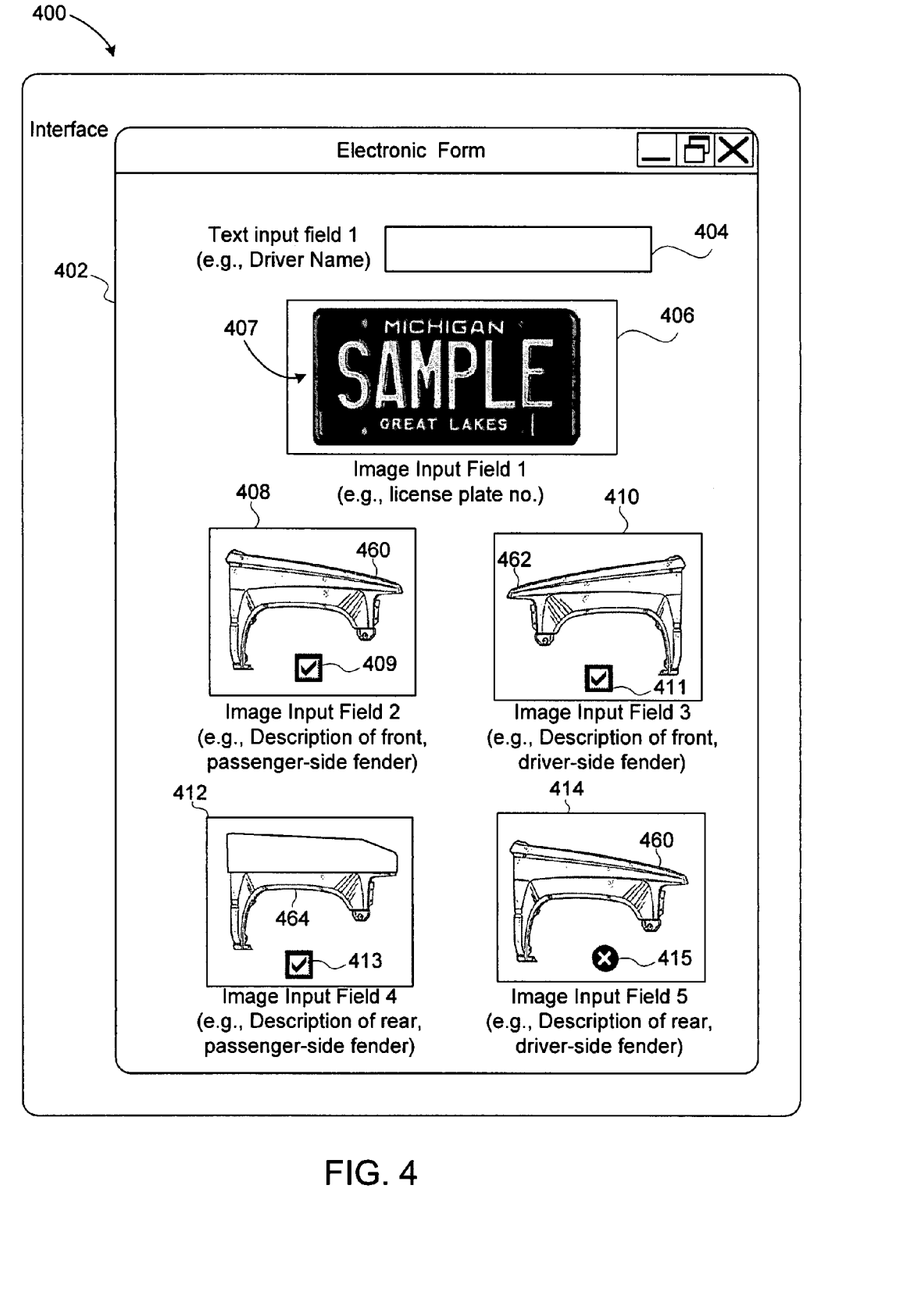

FIGS. 3 and 4 are examples of interfaces implementing one or more content input fields, according to various embodiments of the invention. In FIG. 3, interface 300 can include a pull-down menu 302 (e.g., "File," "View," etc.), a scroll bar 305, and an electronic form 304. In at least one embodiment, electronic form 304 can include any number of text input fields, such as text input field ("1") 306a, text input field ("2") 306b, text input field ("3") 306c, and text input field ("4") 306d. These text input fields can be configured to accept, for example, alpha-numeric characters as input data. Electronic form 304 can also include one or more content input fields, such as an image input field 310 and a content input field 320. In an exemplary application, consider that electronic form 304 is implemented as part of a computer program for processing the condition of an automobile, such as used by a car repair shop or a car rental agency.

Consider that electronic form 304 can be used to memorialize damage to an automobile as well as related information. For example, input field ("1") 306a, text input field ("2") 306b, text input field ("3") 306c, and text input field ("4") 306d can be configured to respectively accept data representing a driver name, an address, a license number, and a time of accident. A user of electronic form 304 can select 310 to sample an image of an automobile 312 as a subject. While viewing automobile 312 in the context of image input field 310, the user can capture and recapture image data to optimally depict, for example, the extent of damage 314 associated with automobile 312. Optionally, content input field 320 can be configured to accept any content as input, such as a sound. As such, when the user selects to accept content input field 320, a sound can be captured. For example, the user can record the driver's verbal account of the accident. In some cases, once the user is satisfied, electronic form 304 can be used to produce an electronic document. In one embodiment, producing an electronic document includes, in whole or in part, saving data for electronic form 304 in association with other data that represents the captured image of automobile 312 and/or the captured sound corresponding to content input field 320.

FIG. 4 depicts an interface 400 including an electronic form 402, according to another embodiment of the invention. In this example, electronic form 402 includes an optional text input field ("1") 404, and image input fields 406, 408, 410, 412, and 414. To illustrate the functionality of electronic form 402, consider that text input field ("1") 404, and image input fields 406, 408, 410, 412, and 414 are configured to capture information about the condition of a rental car returned from a customer. Here, text input field ("1") 404 can be configured to accept user input, such as the driver's name. Image input field ("1") 406 can be configured to capture an image of a license plate 407 and license plate number.

A controller, which is not shown, can generate electronic form 402 and image input field 406. In one embodiment, the controller can also be configured to test whether image data representing the image in image input field 406 meets a threshold indicative that the image data complies with one or more requirements. As used herein, the term "requirement," can refer to, at least in one embodiment, a threshold against which an interpreter analyzes content to interpret whether the content includes an identifiable characteristic. An example of such a requirement is that the captured license plate number in image input field 406 must match a predetermined license plate number for the returned automobile. Thus, the controller can be configured to identify the automobile. In a specific embodiment, an interpreter (not shown) can perform optical character recognition processes to determine a string of characters, such as "SAMPLE," and then determine whether SAMPLE has access to other information stored in relation to that license plate number. In this case, an interpreter can determine that each of the letters meet a requirement, or threshold, for identifying each of the letters as S, A, M, P, L, and E. A validator, in turn, can determine whether the license plate number (e.g., SAMPLE) is a characteristic of image input field 406 for which the validator can operate to validate.

Further to the preceding example, consider that each of image input fields 406, 408, 410, 412, and 414 is associated with at least one characteristic, such as the type of fender for an automobile. Specifically, image input field ("2") 408 can be associated with a front, passenger-side fender, image input field ("3") 410 can be associated with a front, driver-side fender, image input field ("4") 412 can be associated with a rear, passenger-side fender, and image input field ("5") 414 can be associated with a rear, driver-side fender. Next, consider that the interpreter is configured to interpret subjects presented in image input fields 406, 408, 410, 412, and 414 as one of a number of different fender types. Further, consider that a validator (not shown) can validate whether an interpreted fender type matches (or likely matches) the characteristic associated with a particular image input field.

In operation, a user might capture an image in image input field ("2") 408, with the interpreter subsequently interpreting the image as including front, passenger-side fender 460. Then, the validator can validate whether the captured image matches the characteristic corresponding to the image input field, and, in response to a positive match, the validator can generate a match indication 409 to signify that the captured image is in the correct image input field. Similarly, the interpreter can interpret the images in image input field ("3") 410 and image input field ("4") 412 as including front, driver-side fender 462 and rear, passenger-side fender 464, respectively. The validator then can generate match indications 411 and 413 to indicate positive matches to the corresponding characteristics. But note that if the user captures front, passenger-side fender 460 in image input field ("5") 414, which is associated with rear, driver-side fenders, then the validator can generate a no-match indication 415 that signifies that there is mismatch to the corresponding characteristic. The user then can recapture the correct subject for image input field ("5") 414. Thereafter, an electronic document can be finalized.

Figure 5:
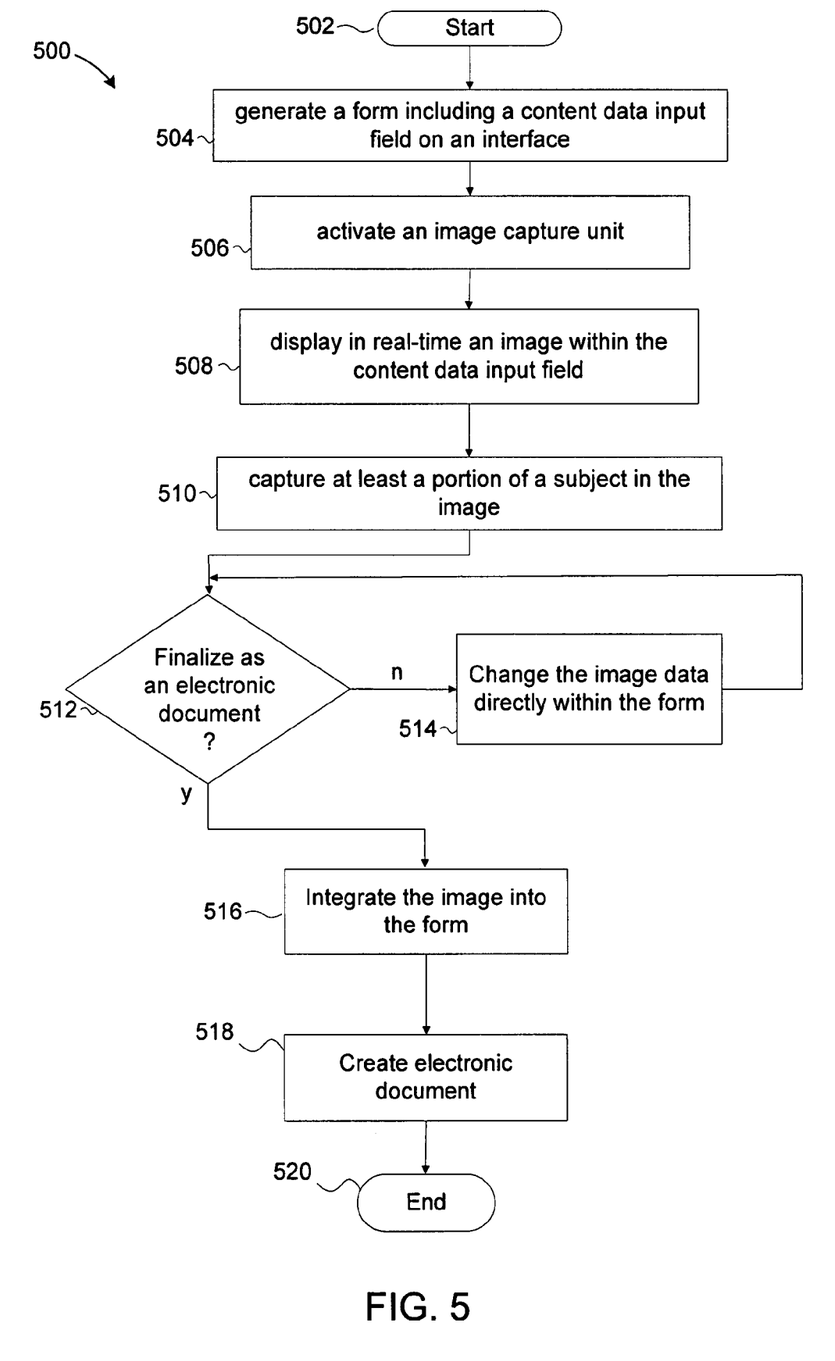
FIG. 5 is a flow diagram depicting one example of a method for creating an electronic document, according to one embodiment of the invention.

FIG. 5 is a flow diagram depicting one example of a method for creating an electronic document, according to one embodiment of the invention. As shown, flow 500 begins at 502, with an interface, a processor, an application and/or logic, generating a form including a content input field at 504. Flow 500 detects the activation of a content capture device, such as an image capture unit, at 506. At 508, an image is displayed in real-time (or substantially in real-time) within or in association the content input field. At least a portion of the content (e.g., image) is captured at 510. A determination is made at 512 whether to finalize the form. If the form is yet to be finalized, flow 500 continues to 514 at which the content data (e.g., "image data") representing the captured image can be changed, or modified. But if the form is to be finalized into an electronic document, then flow 500 continues to 516. Here, captured content or recaptured content can be integrated into the form to create an electronic document at 518. Flow 500 terminates at 520.

Figure 6:
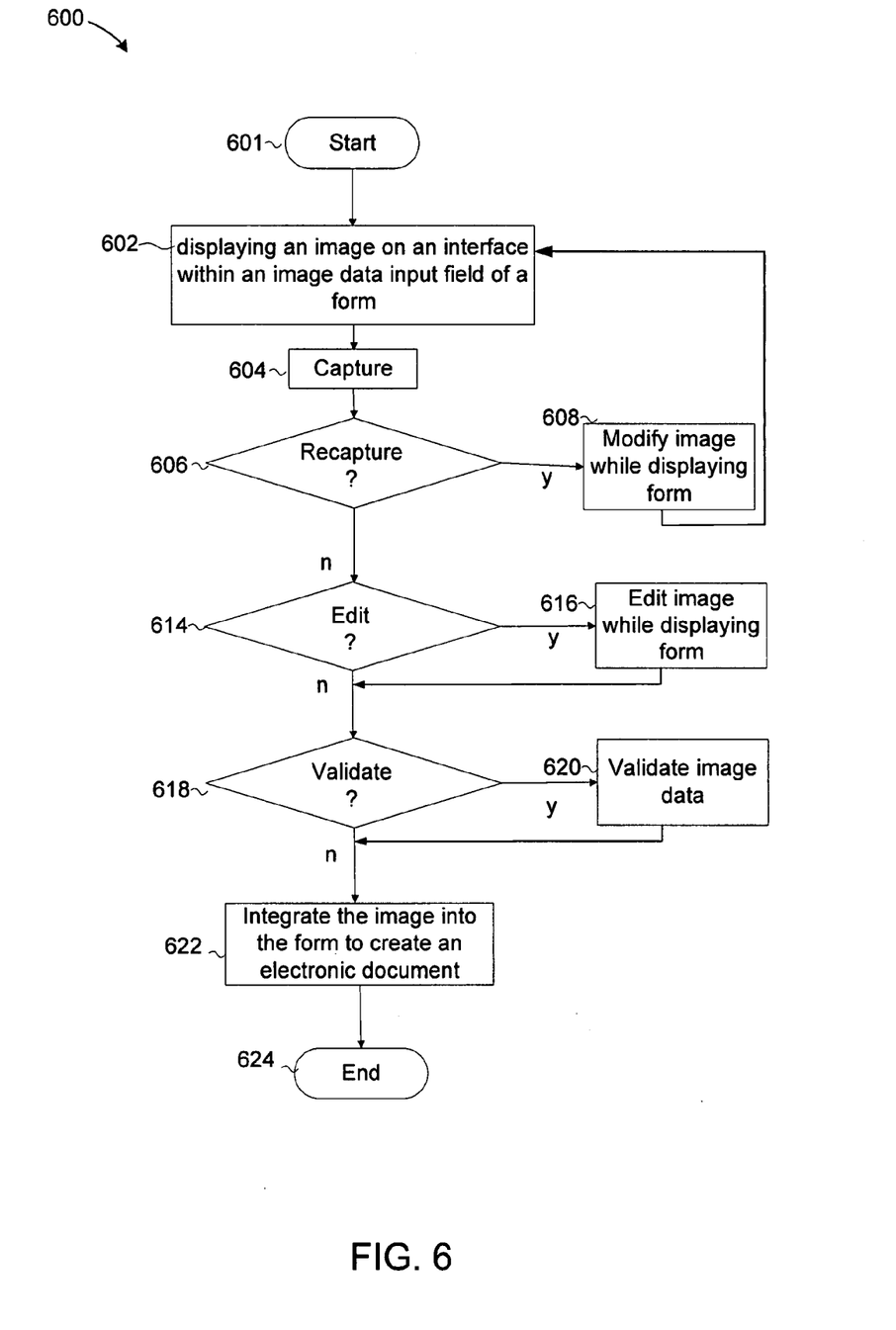
FIG. 6 is a flow diagram depicting another example of a method for creating an electronic document, according to another embodiment of the invention.

FIG. 6 is a flow diagram depicting another example of a method for creating an electronic document, according to another embodiment of the invention. As shown, flow 600 begins at 601, with an interface, a processor, an application and/or logic, displaying an image in an interface at 602 in connection with an image data input field for an electronic form. Flow 600 provides for the capture of the image at 604. A determination is made at 606 whether to recapture an image. If so, then flow 600 continues to 608 at which the image can be modified in the context of the form (e.g., within and/or while a form is concurrently displayed). But if there is to be no recapture, then flow 600 continues to 614. A determination is made at 614 whether to edit an image. If so, then flow 600 continues to 616 at which the image can be edited in the context of the form. But if there is to be no editing performed, then flow 600 continues to 618. A determination is made at 618 whether to validate an image. If so, then flow 600 continues to 620 at which the image and/or its image data can be validated. But if there is to be no validation, then flow 600 continues to 622 at which the image is integrated into the form to create an electronic document. Flow 600 terminates at 624.

Figure 7A:
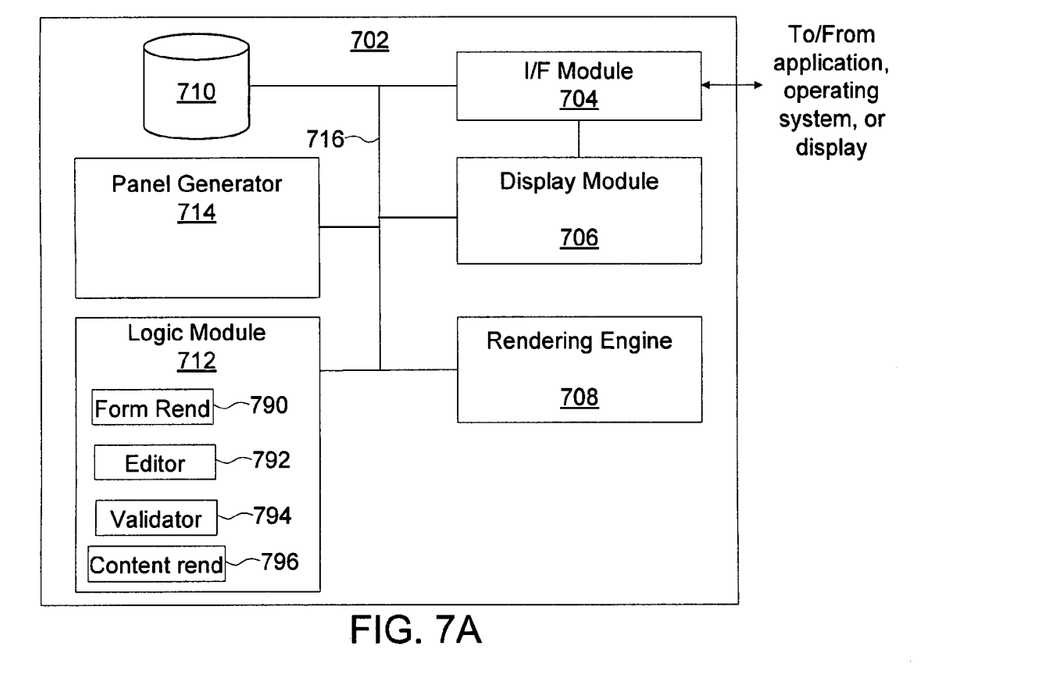
FIGS. 7A and 7B illustrate examples of panel presentation applications for implementing content input fields in electronic forms, according to various embodiments of the invention.

FIG. 7A illustrates an example of a panel presentation application for implementing content input fields in electronic forms, according to various embodiments of the invention. In at least one embodiment, an electronic form including a content input field can be implemented in a panel, such as a single panel. Here, application 702 includes interface ("I/F") module 704, display module 706, rendering engine 708, repository 710, logic module 712, panel generator 714, and data bus 716. In some examples, the number and type of elements shown and described may be varied and are not limited to the descriptions provided. In some examples, the above-described elements can be implemented as part, component, or module of application 702. As an example, application 702 can be implemented to include either a web-based form or an electronic form as part of a software product, and can have content input field functionality as described herein. Logic module 712 can be implemented as software, hardware, circuitry, or a combination thereof to implement control logic for the described techniques for panel presentation.

Figure 9:
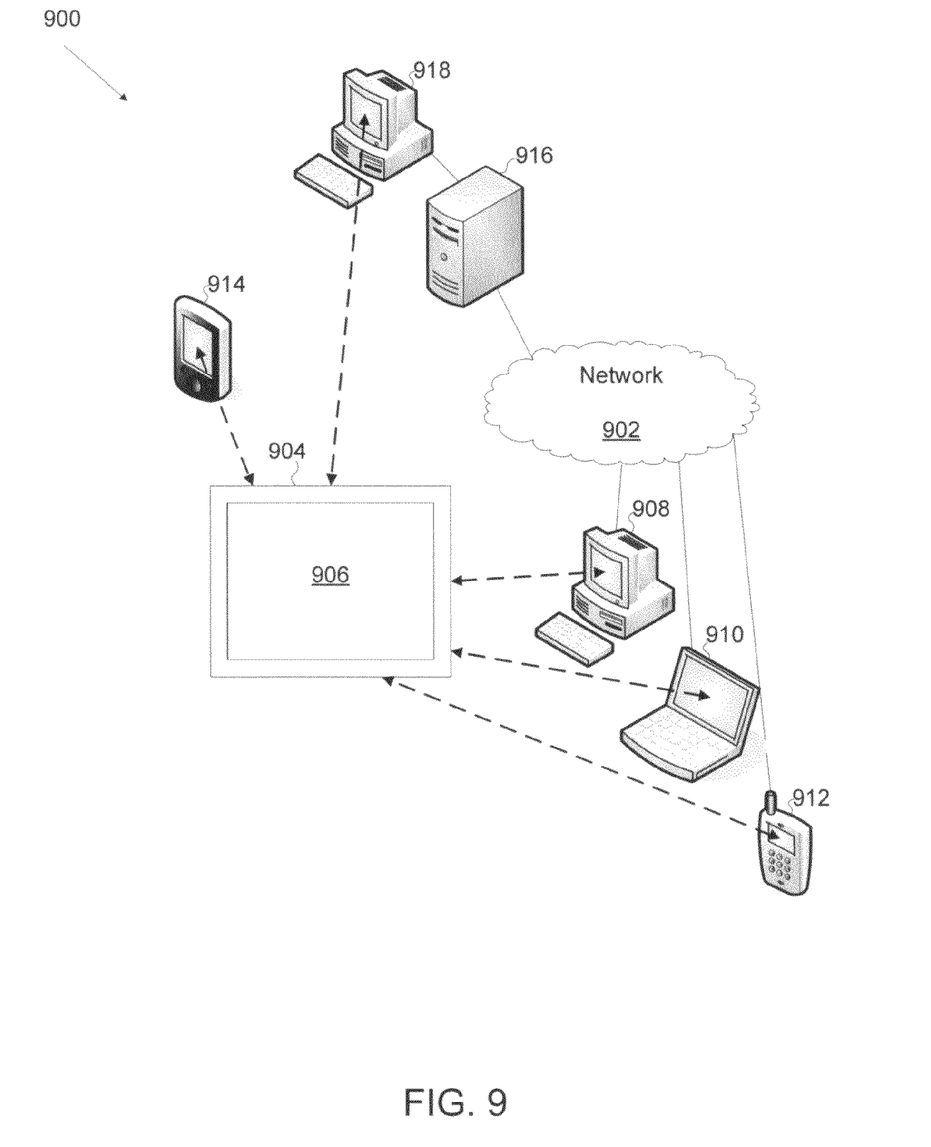
FIG. 9 illustrates an example of a panel presentation system for implementing content input fields in electronic forms.

In some examples, logic module 712 can be configured to control panel generator 714 to form electronic forms and/or content input fields. Rendering engine 708 can be configured to operate as a layout engine for web pages, for example, to manipulate both content (e.g., as expressed in or including HTML, XML, image files, etc.) and formatting information (e.g., as expressed in or including CSS, XSL, etc.) for rendering the data or information as one or more panels on interface 906 (FIG. 9). Interface module 704 can exchange panel presentation data, including content data, image data, audio data, as well as other data, between application 702 and another application (e.g., a host, client, web services-based, distributed (i.e., enterprise), application programming interface ("API"), operating system, program, procedure or others) that can use data and information generated from panel generator 714 to render presented panels on a display screen. In other examples, the above-described techniques and elements can be varied in design, implementation, and function and are not limited to the descriptions provided.

In one embodiment, logic module 712 can include a form renderer module ("form rend") 790, an editor module ("Editor") 792, a validator module ("validator") 794, and a content renderer module ("content rend") 796. Renderer module 790 is configured to provide data, for example, to panel generator 714 for generating an electronic form. The data can include form layer data for generating form layer 204 (FIG. 2). Editor module 792 is configured to manage the editing of content data. Validator module 794 is configured to validate whether content includes a characteristic associated with a content input field. Content renderer module 796 is configured to generate a content layer, such as an image layer 208 (FIG. 2). Thus, renderer module 796 can provide image layer data to generate, in whole or in part, an image layer for presenting content in real-time with respect to the content input field.

Figure 7B:
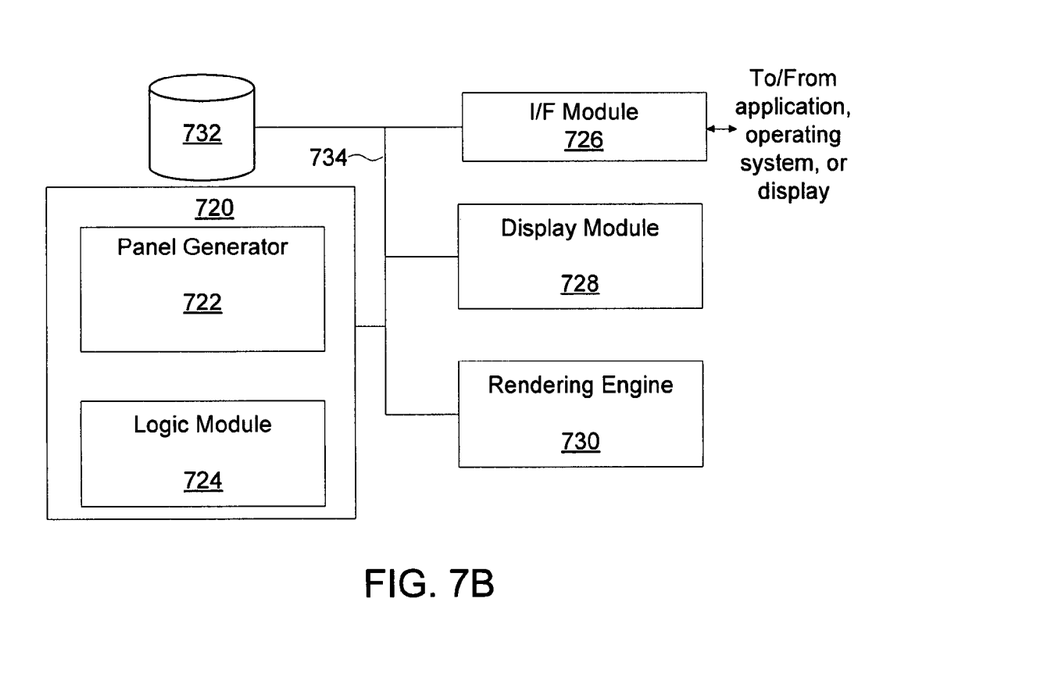

FIG. 7B illustrates an alternative example of a panel presentation application for implementing content input fields in electronic forms, according to one embodiment of the invention. Here, application 720 includes panel generator 722 and logic module 724, which can have equivalent functionality as 712 of FIG. 7A. Further, application 720 is shown in data communication with interface ("I/F") module 726, display module 728, rendering engine 730, and repository 732. Data bus 734 can be configured to send or receive data among application 720, I/F module 726, display module 728, rendering engine 730, and repository 732. In other examples, more, fewer or different elements can be used and implemented without limitation to the examples provided above.

In some examples, logic module 724 and panel generator 722 can be implemented as part of application 720, which can be implemented separately from other functional components or modules, such as interface module 726, display module 728, rendering module 730, and repository 732. Data bus 734 can be implemented to communicate data over a given port between application 720 and interface module 726, display module 728, rendering module 730, and repository 732. In other words, application 720 can be implemented as a standalone application or as a component (i.e., module) of another application. Data or information (e.g., content, characteristics, captured content, recaptured content, edited content, text data, and the like) associated with a panel can be stored in repository 732, which can be implemented using a database, data store, data warehouse, or any other type of data repository or structure. In other examples, more, fewer, or different modules can be used to implement the described techniques for panel presentation and are not limited to those provided.

Figure 8:
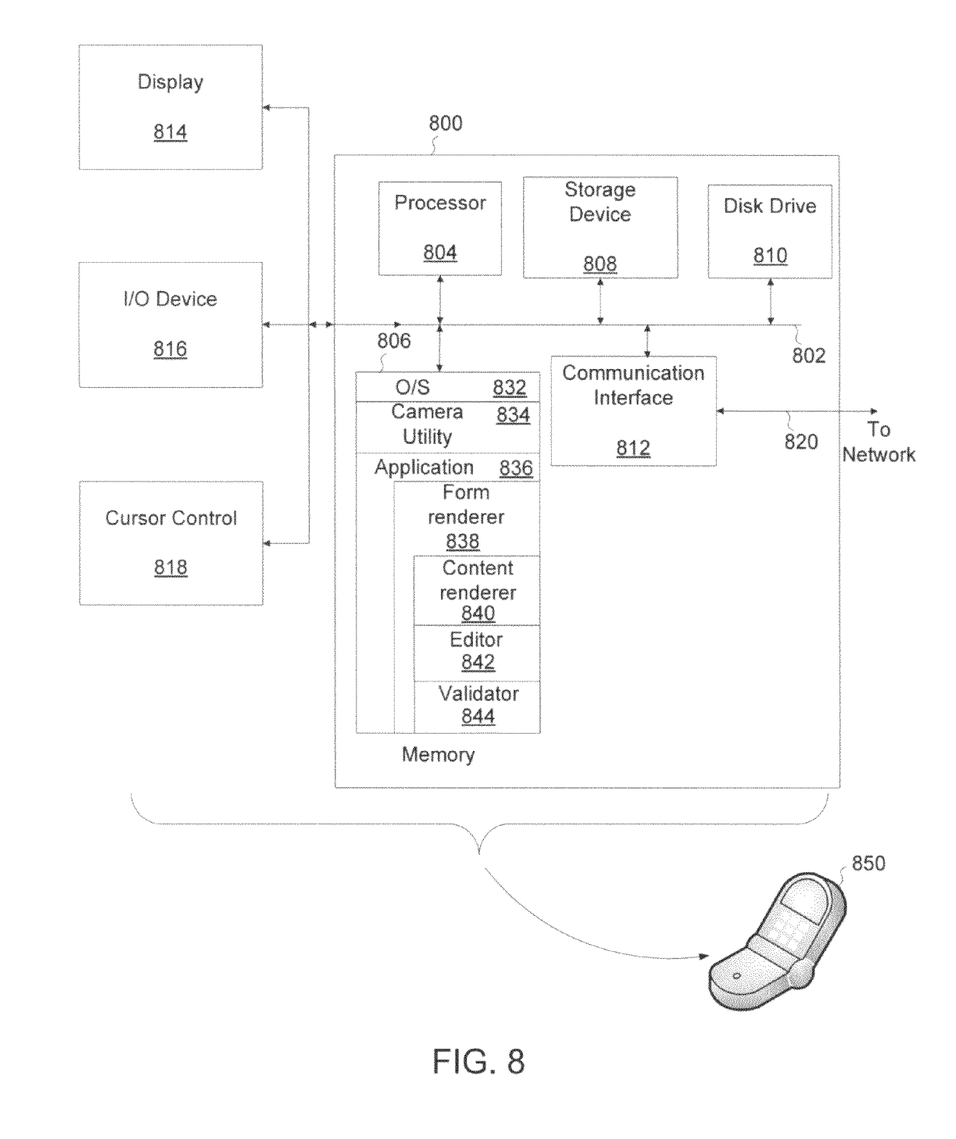
FIG. 8 illustrates an example of a computer system suitable for implementing content input fields in electronic forms for an interface, according to at least one embodiment of the invention.

FIG. 8 illustrates an exemplary computer system suitable for implementing content input fields in electronic forms for an interface, according to at least one embodiment of the invention. In some examples, computer system 800 can be used to implement computer programs, applications, methods, processes, or other software to perform the above-described techniques and to realize the structures described herein. Computer system 800 includes a bus 802 or other communication mechanism for communicating information, which interconnects subsystems and devices, such as processor 804, system memory ("memory") 806, storage device 808 (e.g., ROM), disk drive 810 (e.g., magnetic or optical), communication interface 812 (e.g., modem or Ethernet card), display 814 (e.g., CRT or LCD), input device 816 (e.g., keyboard), and cursor control 818 (e.g., mouse or trackball). In one embodiment, cursor control 818 can select a content input field and input device 816 can include a user input interface, such as a direction key, whereby both cursor control 818 and input device 816 can collaborate to capture and modify content.

According to some examples, computer system 800 performs specific operations in which processor 804 executes one or more sequences of one or more instructions stored in system memory 806. Such instructions can be read into system memory 806 from another computer readable medium, such as static storage device 808 or disk drive 810. In some examples, hard-wired circuitry can be used in place of or in combination with software instructions for implementation. In the example shown, system memory 806 includes modules of executable instructions for implementing an operation system ("O/S") 832, a camera utility module 834, and an application 836 for creating electronic documents. Camera utility module 834 includes instructions for integrating the functionality of an image capture unit or device (e.g., such as an I/O device 816) with an electronic form and its content input field. Camera utility module 834 can monitor selection of a content input field and can activate, for example, a camera to initiate streaming of image data into the content input field. Application 836 includes additional instructions in the following modules: form renderer 838, content renderer 840, editor 842, and/or validator 844. In one embodiment, system memory 806 can be configured to stored data for form layer 204 (FIG. 2) and/or image layer 208 (FIG. 2) for translation with respect to each other.

The term "computer readable medium" refers, at least in one embodiment, to any medium that participates in providing instructions to processor 804 for execution. Such a medium can take many forms, including but not limited to, non-volatile media, volatile media, and transmission media. Non-volatile media includes, for example, optical or magnetic disks, such as disk drive 810. Volatile media includes dynamic memory, such as system memory 806. Transmission media includes coaxial cables, copper wire, and fiber optics, including wires that comprise bus 802. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In some examples, execution of the sequences of instructions can be performed by a single computer system 800. According to some examples, two or more computer systems 800 coupled by communication link 820 (e.g., LAN, PSTN, or wireless network) can perform the sequence of instructions in coordination with one another. Computer system 800 can transmit and receive messages, data, and instructions, including program, i.e., application code, through communication link 820 and communication interface 812. Received program code can be executed by processor 804 as it is received, and/or stored in disk drive 810, or other non-volatile storage for later execution. In one embodiment, system 800 is implemented as a hand-held device, such as a mobile phone 850. But in other embodiments, system 800 can be implemented as a personal computer (i.e., a desk top computer) or any other computing device.

FIG. 9 illustrates an example of a panel presentation system for implementing content input fields in electronic forms. Here, system 900 includes network 902, display environment 904, interface 906, which can be presented on devices such as computer 908, notebook computer ("notebook" or "laptop") 910, smart phone 912, personal digital assistant ("PDA") 914, server 916, and administrator computer 918. In other examples, the number and type of devices can be varied and are not limited to those shown and described.

In some examples, one or more panels for creating electronic documents can be presented on interface 906, which can be an interface for an application such as a web browsing program, Internet content portal, client or desktop application for any purpose. Panels can be used to provide additional or supplemental information that can be contextually relevant to another panel presented in interface 906. Computer 908, notebook computer ("notebook" or "laptop") 910, smart phone 912, personal digital assistant ("PDA") 914, server 916, and administrator computer 918 can provide content data for rendering content as well as other data, which can be implemented to generate, for example, an electronic form and content input field in interface 906. In some cases, an operating system installed on computer 908 can communicate (i.e., via an application programming interface ("API")) content data and/or other electronic form-related data to another application installed on computer 908 to render (i.e., interpreting data and information to draw or display the content in an interface) one or more panels presented in interface 906. In some examples, different types of panels can be rendered in interface 906. In one embodiment, interface 906 can include any number and/or any type of display environments, such as CRT and LCD displays. Note that the above-described system and elements can be varied and are not limited to the descriptions or examples provided.

In at least some of the embodiments of the invention, the structures and/or functions of any of the above-described interfaces and panels can be implemented in software, hardware, firmware, circuitry, or a combination thereof. Note that the structures and constituent elements shown in FIGS. 7A to 9, as well as their functionality, can be aggregated with one or more other structures or elements. Alternatively, the elements and their functionality can be subdivided into constituent sub-elements, if any. As software, the above-described described techniques can be implemented using various types of programming or formatting languages, frameworks, syntax, applications, protocols, objects, or techniques, including C, Objective C, C++, C#, Flex™, Fireworks®, Java™, Javascript™, AJAX, COBOL, Fortran, ADA, XML, HTML, DHTML, XHTML, HTTP, XMPP, and others. These can be varied and are not limited to the examples or descriptions provided.

The foregoing description, for purposes of explanation, used specific nomenclature to provide a thorough understanding of the invention. However, it will be apparent to one skilled in the art that specific details are not required in order to practice the invention. In fact, this description should not be read to limit any feature or aspect of the present invention to any embodiment; rather features and aspects of one embodiment can readily be interchanged with other embodiments.

Thus, the foregoing descriptions of specific embodiments of the invention are presented for purposes of illustration and description. They are not intended to be exhaustive or to limit the invention to the precise forms disclosed; many alternatives, modifications, equivalents, and variations are possible in view of the above teachings. For the purpose of clarity, technical material that is known in the technical fields related to the embodiments has not been described in detail to avoid unnecessarily obscuring the description. Thus, the various embodiments can be modified within the scope and equivalents of the appended claims. Further, the embodiments were chosen and described in order to best explain the principles of the invention and its practical applications; they thereby enable others skilled in the art to best utilize the invention and various embodiments with various modifications as are suited to the particular use contemplated. Notably, not every benefit described herein need be realized by each embodiment of the present invention; rather any specific embodiment can provide one or more of the advantages discussed above. In the claims, elements and/or operations do not imply any particular order of operation, unless explicitly stated in the claims. It is intended that the following claims and their equivalents define the scope of the invention.

What is claimed:

1. A method, comprising:
displaying, on a display of an electronic device, an electronic form comprising one or more text input fields simultaneously displayed with a content capture input field;
in response to receiving a selection of the content capture input field in the electronic form, activating a content capture unit of the electronic device comprising a camera or microphone;
presenting, within the selected content capture input field, a representation of content captured by the content capture unit of the electronic device; and
integrating the representation of content into the electronic form such that the electronic form includes a form layer and a content layer, the form layer configured to present at least a portion of the representation of content included in the content layer, and the content layer being configured to translate the representation of content relative to the content input field.

2. The method of claim 1, further comprising:
modifying the representation of content captured by the content capture unit prior to presenting the representation of content in the selected content input field.

3. The method of claim 2, wherein the representation of content includes an image, and the method further comprises translating the image relative to a boundary of the selected content input field to include a characteristic of a subject of the image in the selected content input field.

4. The method of claim 1, wherein integrating the representation of content excludes importing a file.

5. The method of claim 1, wherein the content capture unit is an image capture unit.

6. The method of claim 1, wherein the representation of content includes an image, and the integrating comprises:
capturing at least a portion of a subject in the image within the selected content input field.

7. The method of claim 6, further comprising generating a preview of an electronic document file that includes the representation of the captured image.

8. The method of claim 7, further comprising:
editing the captured image within the selected content input field; and
generating an edited image.

9. The method of claim 7, further comprising editing the captured image within the selected content input field without transitioning from the electronic form to an editor application.

10. The method of claim 1, further comprising validating whether content data representing the representation of content meets a first threshold, wherein the validating indicates whether the content data includes a specified characteristic.

11. The method of claim 10, further comprising testing whether content data representing the representation of content meets a second threshold, wherein the validating indicates whether the content data complies with one or more requirements.

12. The method of claim 1, further comprising associating the selected content input field with at least a portion of the representation of content.

13. The method of claim 12, further comprising presenting information, in an interface, that indicates the association between the portion of the representation of content and the selected content input field.

14. The method of claim 12, further comprising validating whether the portion of the representation of content includes a specified characteristic.

15. The method of claim 1, wherein the selected content input field is substantially transparent, and wherein the integrating further comprises:
translating the representation of content during presentation of the representation of content within the substantially transparent selected content input field.

16. The method of claim 1, further comprising presenting a content editor for editing the representation of content, wherein the content editor is configured to accept user input to edit the representation of content in-situ in the electronic form.

17. The method of claim 16 wherein presenting the content editor further comprises presenting the edited content in association with the selected content input field while presenting the electronic form in an interface.

18. The method of claim 1, further comprising previewing the representation of content, wherein the previewing comprises:
presenting either an image or a sound, or both, in the content capture input field.

19. An electronic device, comprising:
a content capture unit configured to capture digitized image or audio content;
a memory configured to store instructions executable to display, on a display of the electronic device, an electronic form, wherein the electronic form comprises one or more text input fields simultaneously displayed with a content capture input field;
a processor coupled to the memory and configured to:
in response to receiving a selection of the content capture input field in the electronic form, activate the content capture unit of the electronic device;
present a representation of content captured by the content capture unit within the selected content capture input field; and
integrate the representation of content into the electronic form such that the electronic form includes a form layer and a content layer, the form layer configured to present at least a portion of the representation of content included in the content layer, and the content layer being configured to translate the representation of content relative to the content input field.

20. The electronic device of claim 19, wherein the processor is further configured to validate whether the representation of content includes a specified characteristic.

21. A computer readable storage medium, excluding signals per se, comprising executable instructions to:
display, on a display of an electronic device, an electronic form comprising one or more text input fields simultaneously displayed with a content capture input field;
in response to receiving a selection of the content capture input field, activate a content capture unit of the electronic device comprising a camera or microphone;
present a representation of content captured by the content capture unit within the selected content capture input field; and
integrate the representation of content into the electronic form such that the electronic form includes a form layer and a content layer, the form layer configured to present at least a portion of the representation of content included in the content layer, and the content layer being configured to translate the representation of content relative to the content input field.

22. The computer readable storage medium of claim 21, further comprising executable instructions to associate one or more additional content capture input fields with the content capture input field.

* * * * *